US008752988B2

(12) United States Patent
Tomio

(10) Patent No.: US 8,752,988 B2

(45) Date of Patent: Jun. 17, 2014

(54) TAILLIGHT FOR AUTOMOTIVE TRAILERS OR VEHICLES WITH BUILT-IN COMMUNICATION RF SIGNAL ANTENNA

(71) Applicant: Naira Hosana Silvestrini Maschio, Curitiba (BR)

(72) Inventor: Norberto Tomio, Curitiba (BR)

(73) Assignee: Naira Hosana Silvestrini Maschio, Curitiba (BR)

( * ) Notice: Subject to any disclaimer, the term of this patent is extended or adjusted under 35 U.S.C. 154(b) by 126 days.

(21) Appl. No.: 13/623,507

(22) Filed: Sep. 20, 2012

(65) Prior Publication Data

US 2013/0077333 A1 Mar. 28, 2013

(30) Foreign Application Priority Data

Sep. 22, 2011 (BR) ..................................... 1106023

(51) Int. Cl.
*B60Q 3/00* (2006.01)

(52) U.S. Cl.
USPC ............................ 362/485; 362/499; 362/549

(58) Field of Classification Search
USPC ......... 362/485, 520, 253, 498, 499, 541, 548, 362/549; 340/479, 480
See application file for complete search history.

(56) References Cited

U.S. PATENT DOCUMENTS

| | | | | |
|---|---|---|---|---|
| 4,859,982 | A * | 8/1989 | Seaburg | 340/475 |
| 6,259,475 | B1 * | 7/2001 | Ramachandran et al. | 348/148 |
| 7,088,222 | B1 * | 8/2006 | Dueker et al. | 340/321 |
| 7,091,843 | B1 * | 8/2006 | Lal | 340/468 |
| 7,145,449 | B2 * | 12/2006 | Kim | 340/475 |
| 7,961,086 | B2 * | 6/2011 | Bradley | 340/468 |
| 8,330,598 | B2 * | 12/2012 | Szucs | 340/540 |
| 8,441,394 | B2 * | 5/2013 | Alland | 342/70 |
| 2007/0242339 | A1 * | 10/2007 | Bradley | 359/237 |

* cited by examiner

*Primary Examiner* — John A Ward

(74) *Attorney, Agent, or Firm* — Enshan Hong; Kent H. Cheng; VLP Law Group LLP

(57) ABSTRACT

There is provided a taillight for vehicles or trailer trucks with built-in RF signal communication antenna which, according to its features, enables the creation of a taillight with its own specific structure, electromechanical type and destined to place a lighting module with lighting function and a RF signal communication antenna with RF signal communication function regardless the frequency or type of signal on the surface of vehicles or trailer trucks in general, in order to enable an extremely practical, safe and precise way to optimize the procedures for placing communication RF signal antennas and their signal transmissions in vehicles or automotive trailers, with complete invisibility and excellent elimination of any interference in these transmissions.

1 Claim, 7 Drawing Sheets

TAILLIGHT FOR AUTOMOTIVE TRAILERS OR VEHICLES WITH BUILT-IN COMMUNICATION RF SIGNAL ANTENNA

FIELD OF THE INVENTION

The present invention patent refers to automotive accessories in general, but more specifically to a taillight for vehicles or trailer trucks with built-in integrated RF signal communication antenna which, according to its general features, has as basic principle to enable the formation of a electromechanical type taillight with its own structure and destined to place a lighting module with lighting function and a RF communication signal antenna module with RF communication signal function regardless the signal frequency or type on the surface of automotive trailers or vehicles in general, in order to enable an extremely practical, safe and precise way to optimize the procedures for placing communication RF signal antennas and their signal transmissions in vehicles or automotive trailers, along with complete invisibility and excellent elimination of interferences in transmissions, having as a base, a taillight with great resistance, safety and versatility. With specific design and shape according to the application and of easy access for a better adaptation and safety of users, practical features in handling and functionality, under very accessible cost and, due to general characteristics and dimensions, easy to adapt to a broad range of vehicles or trailer trucks, taillights, communication modules, local and general users, regardless of the features they may present.

BACKGROUND OF THE INVENTION

Currently, the RF communication modules, for example, tracking antennas of vehicles or trailer trucks broadly known for the current state of technique, are comprehended by the use of joint or single antennas for RF type signals, and they are fixed or placed close to the communication modules inside environments with simple temperature and humidity control, mostly inside the cabins, or even directly on the metallic carcass, that is, the fixation is made without any specific fixation device for them, without any kind of physical protection and in positions which leave them perfectly invisible. As such it is possible to state that the RF communication modules, especially the ones located externally are completely unprotected from weather and vandalism, stealing and mainly suffering a great number of direct interferences in the signal generated by the RF communication modules and caused by the metallic structure of vehicle or trailer trucks, in both cases generating great and dangerous disturbances for the owners of these vehicles or trailer trucks, as well as for the companies which operate them.

In the specific case of trailer trucks, for it is a very complex environment, a number of solutions are created and they are totally adaptive and not professional at all, such as, for example, not removing the antennas externally, to keep them in place and, consequently, with poor signal transmission quality. In order to avoid this signal loss, one tries to hide the whole RF communication module set inside the taillight, gaining sign for being close to the taillight frame, however, the modules become easily identifiable by thieves.

Due to the currently used structure for the RF signal communication antenna, primarily tracking device antennas used in vehicles and trailer trucks in general, it becomes vital for companies to use a totally innovative conception regarding the disposition and protection of antennas in vehicles and trailer trucks which solves these great inconveniences.

As such, the general conception of the present taillight for vehicles or trailer trucks with RF signal communication antenna, object of the present patent, is totally based on its simple and robust structure with minimum number of components and extremely simplified, safe and optimized operation, along with manufacture and practical maintenance procedures, in order to generate a practical and efficient taillight to enable a complete integration between taillight and RF signal communication antenna, that is, allowing the taillight to generate a perfect lightening in the vehicle or trailer truck's surface and the RF signal communication antenna to generate clear information transmissions of the communication module.

As such, the device was created with very well established goals, such as: hide the RF signal antennas, in order to make them invisible for people in general; eliminate the interference of the metallic structure of vehicles or trailer trucks in the RF signal communication antenna transmissions, making them clear and safe; and increasing the protection of RF signal communication antennas against the weather and matter impacts, to increase their life cycle.

SUMMARY OF THE INVENTION

The patent in question gathers components and processes in a singular conception, which will meet several demands of the nature of its use, that is, to integrate the taillight and the RF signal communication antenna, primarily a tracking antenna used in vehicles or trailer trucks in general. This conception ensures a taillight with great efficiency, functionality, resistance, durability, safety, versatility, precision, cost saving and ergonomics due to the excellent added technical qualities, which promote advantages and improvements in the applications and operation of RF signal communication antennas of vehicles or trailer trucks, and which general features differ from the shapes and models of RF signal communication antennas broadly known currently.

The present patent consists in the use of a modern, efficient, safe and functional lantern for vehicles and trailer trucks with built-in RF signal communication antenna formed by a set of correctly integrated electronic and vehicle set of solutions, creating a complete and singular taillight with its own design, details of fine finishing and proper features, which incorporated its own electromechanical structure, highly durable and resistant and with a perfectly integrated and symmetrically disposed base as taillight fixation element on the vehicle or trailer truck, a set of fixing devices to fix the base on the vehicle or trailer truck, a lighting module as taillight lighting element in the vehicle or trailer truck, an antenna module as signal transmission element and a lens as protection and reflection element of the taillight in the vehicle or trailer truck, in order to enable the formation of a unique set, complete and safe, whose internal and external forms and dispositions enable the perfect adapting to the most diverse types of vehicles or trailer trucks and RF signal communication antennas, being especially designed for these purposes with proper geometry.

The current device is based on the application of components and processes in a differentiated conception without, however, reaching a high degree of sophistication and complexity, enabling it to solve some of the main inconveniences of other forms and models known by the current technique and employed in the placement of RF signal communication antennas in vehicles and trailer trucks in general, which are located in a work area in which use and application difficulties, low efficiency and performance and accidents are very frequent and the ways and/or models are based on simple adaptations, of high level unsafety, great deterioration and frailty, very little durability and resistance, low versatility, completely imprecise, of difficult application, very low output and performance, high interference or sometimes they are big in size, having elevated cost, volume and weight, low flexibility, complex handling, high maintenance, great waste of time, complex manufacture and low performance.

The present application seeks to provide a taillight assembly for a vehicle or trailer truck, comprising: one taillight, the taillight comprising: a symmetrically disposed and built-in base, said base being placed vertically and symmetrically in a whole extension of a posterior face of the taillight and parallel to the surface of the vehicle or trailer truck, the base comprising an anterior-internal face; a set of connectors placed vertically, perpendicularly and symmetrically spaced on a posterior face of the base; a set of packers and clutches placed in parallel and symmetrically spaced in the anterior-internal face of the base; a set of fasteners placed horizontally and symmetrically spaced trespassing the base and the vehicle or trailer truck surface; an RF signal communication antenna module placed vertically, parallel and symmetrically fit through the whole extension of the anterior-internal face of the base, the RF signal communication antenna module comprising an integrated circuit board and a set of openings placed parallel and symmetrically spaced; one lighting module placed vertically and symmetrically fit in the anterior-internal face of the base through a central packer, the lighting module comprising a second integrated circuit board with lighting signs; and one lens placed vertically, parallel and symmetrically in an extension of a front part of the taillight, the lens being fastened by its posterior-lateral extremities into anterior-lateral extremities of the base.

BRIEF DESCRIPTION OF THE DRAWINGS

The goals, advantages and other important features of this patent may be more easily understood when read along with the annexed figures, in which.

DETAILED DESCRIPTION OF THE INVENTION

Figure 1B:
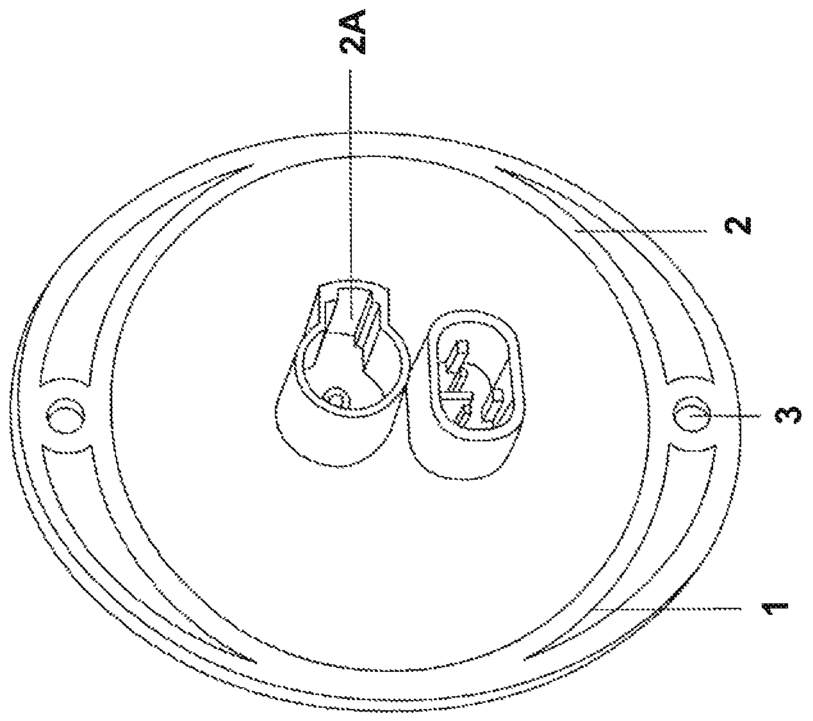
FIG. 1B represents a posterior perspective view of the taillight for vehicles or trailer trucks with built-in RF signal communication antenna.
Figure 1A:
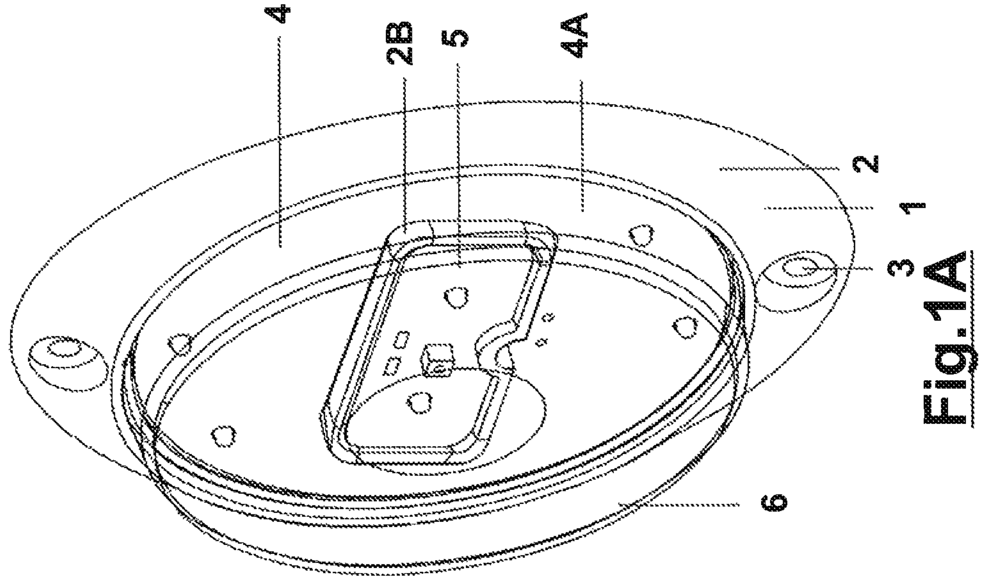
FIG. 1A represents a frontal perspective view of the taillight for vehicles or trailer trucks with built-in RF signal communication antenna.
Figure 1C:
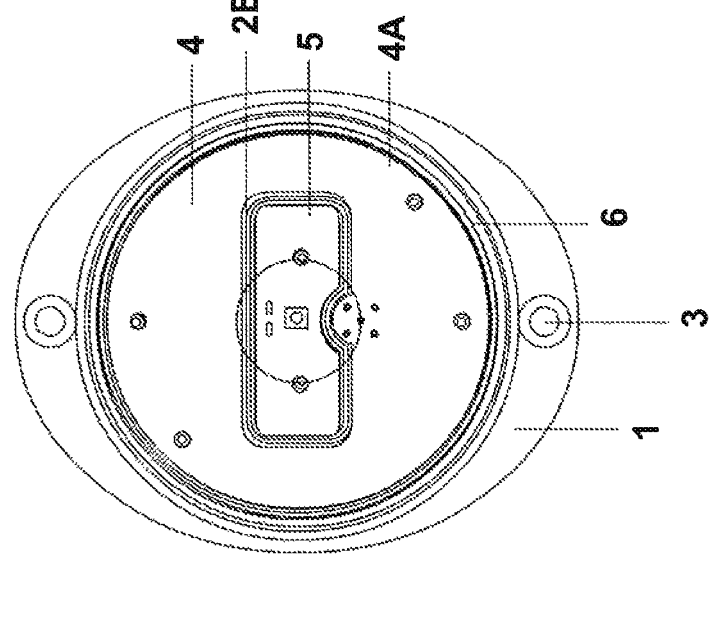
FIG. 1C represents a frontal view of the taillight for vehicles or trailer trucks with built-in RF signal communication antenna.
Figure 1D:
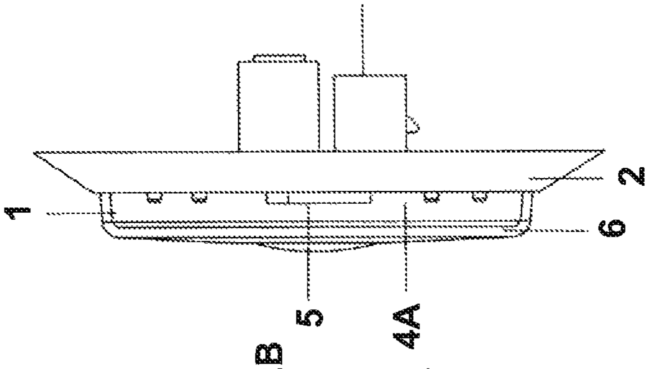
FIG. 1D represents a lateral view of the taillight for vehicles or trailer trucks with built-in RF signal communication antenna.
Figure 1E:
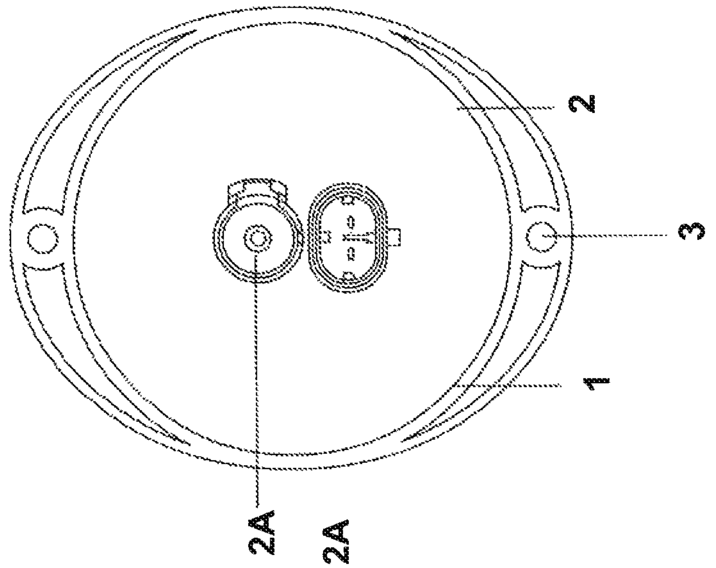
FIG. 1E represents a posterior view of the taillight for vehicles or trailer trucks with built-in RF signal communication antenna.
Figure 1F:
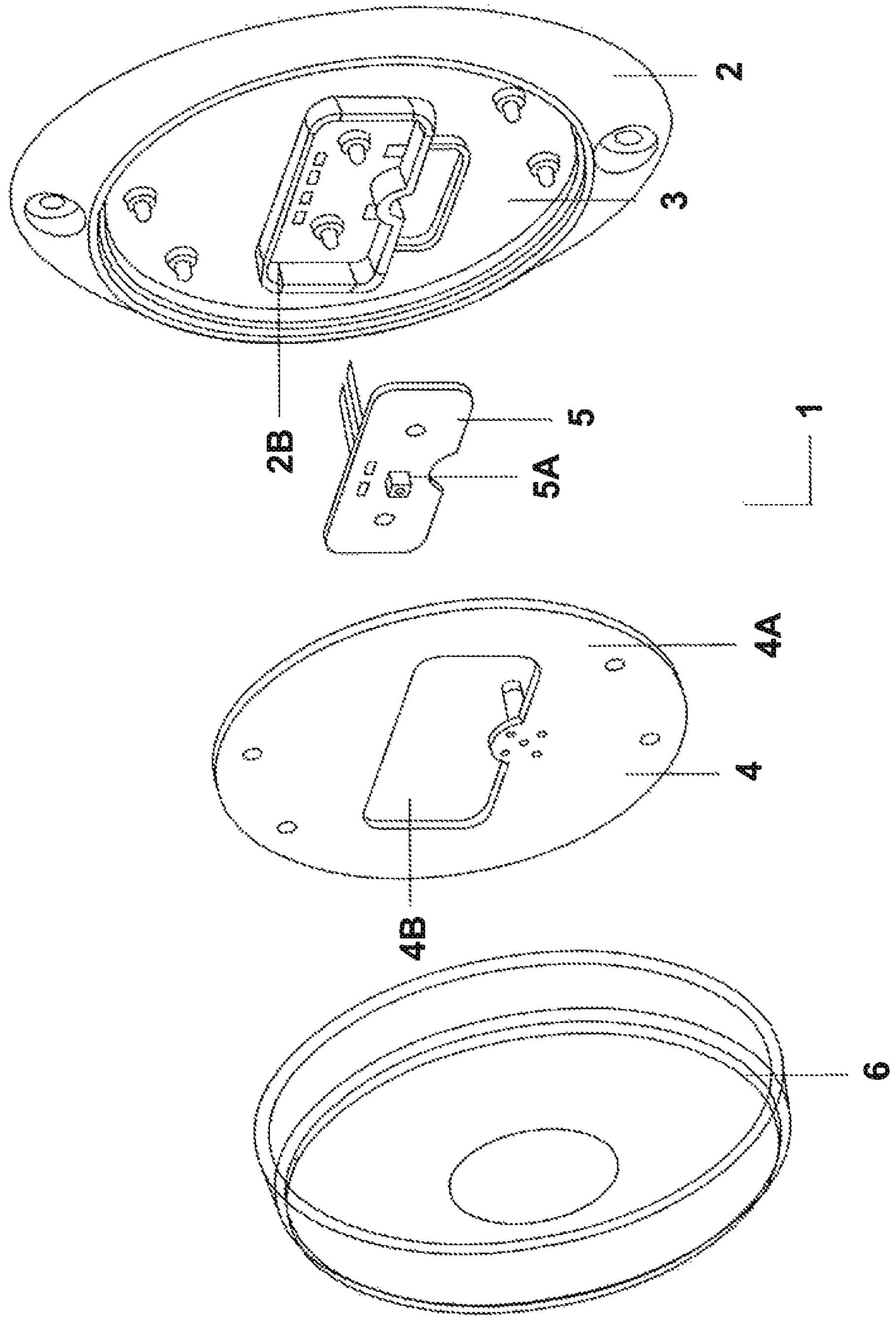
FIG. 1F represents an exploded frontal perspective view of the taillight for vehicles or trailer trucks with built-in RF signal communication antenna.
Figure 2C:
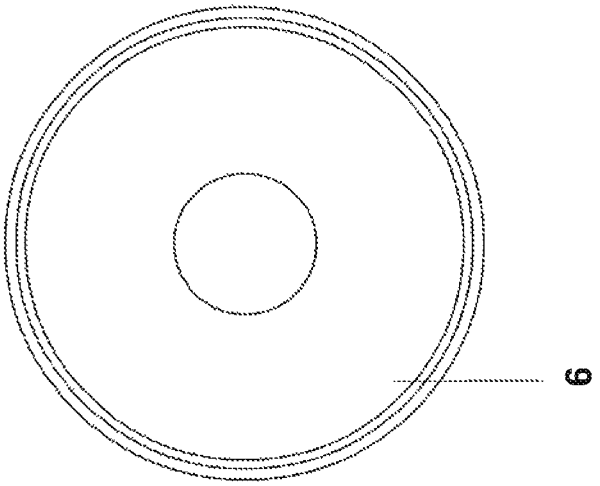
FIG. 2C represents a posterior view of the transparent lens of the taillight for vehicles or trailer trucks with built-in RF signal communication antenna.
Figure 2B:
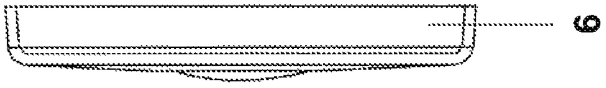
FIG. 2B represents a lateral view of the transparent lens of the taillight for vehicles or trailer trucks with built-in RF signal communication antenna.
Figure 2A:
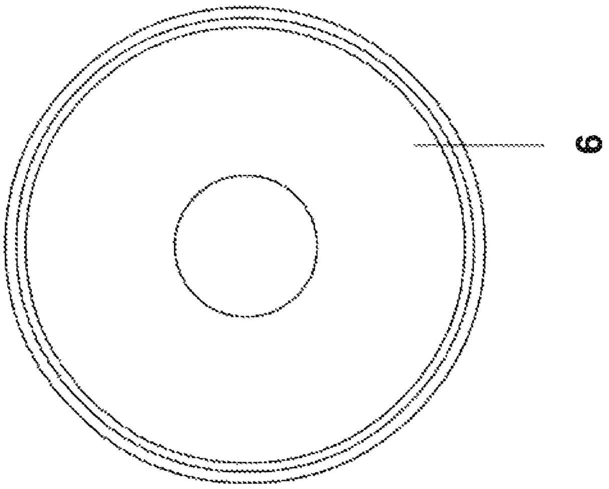
FIG. 2A represents a frontal view of the transparent lens of the taillight for vehicles or trailer trucks with built-in RF signal communication antenna.
Figure 3C:
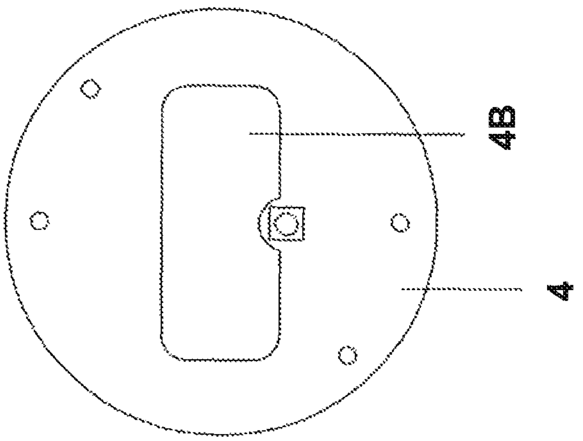
FIG. 3C represents a posterior view of the antenna module of the taillight for vehicles or trailer trucks with built-in RF signal communication antenna.
Figure 3B:
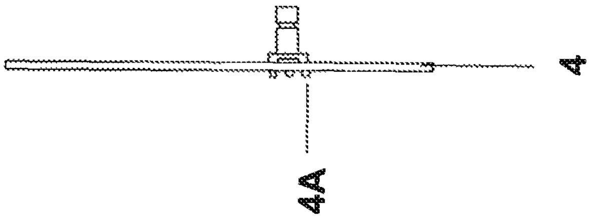
FIG. 3B represents a lateral view of the antenna module of the taillight for vehicles or trailer trucks with built-in RF signal communication antenna.
Figure 3A:
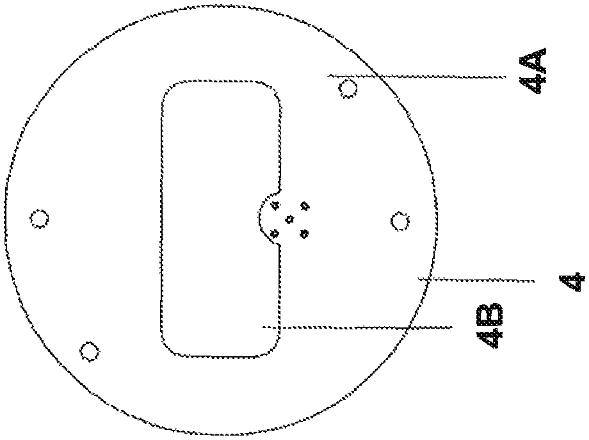
FIG. 3A represents a frontal view of the antenna module of the taillight for vehicles or trailer trucks with built-in RF signal communication antenna.
Figure 4C:
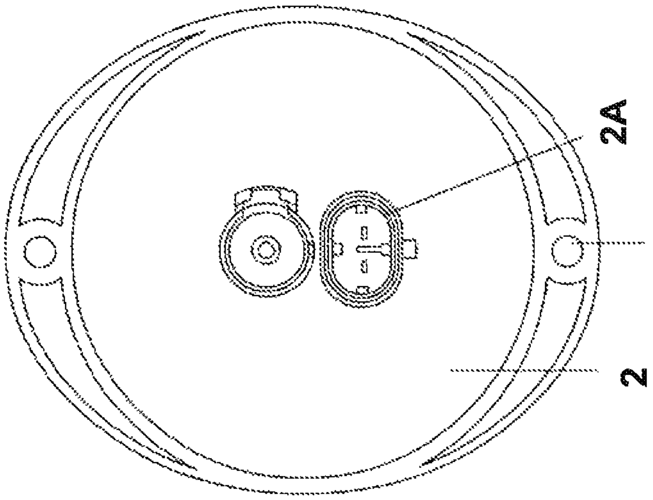
FIG. 4C represents a posterior view of the base of the taillight for vehicles or trailer trucks with built-in RF signal communication antenna.
Figure 4B:
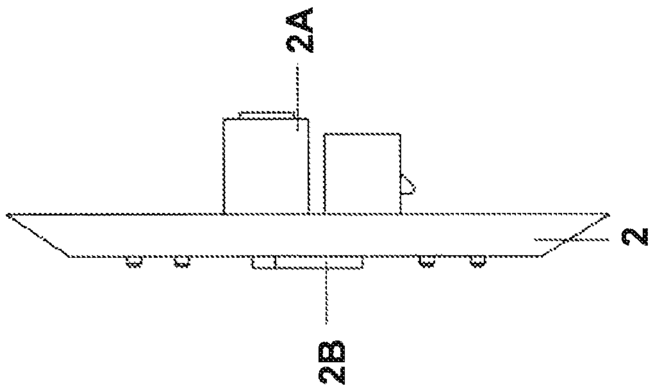
FIG. 4B represents a lateral view of the base of the taillight for vehicles or trailer trucks with built-in RF signal communication antenna.
Figure 4A:
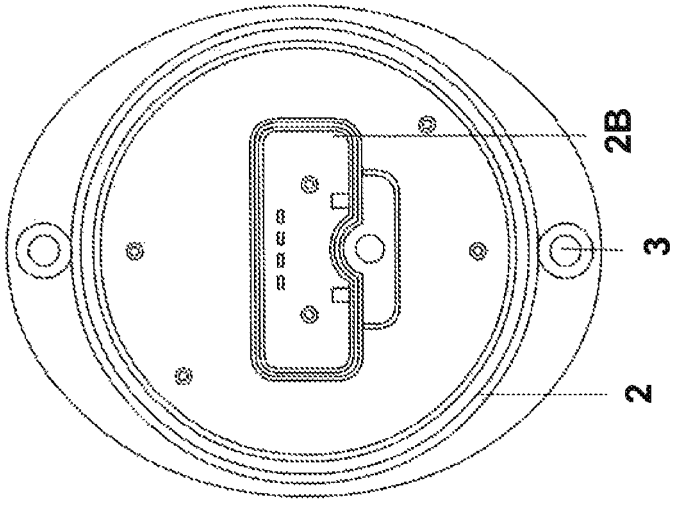
FIG. 4A represents a frontal view of the base of the taillight for vehicles or trailer trucks with built-in RF signal communication antenna.
Figure 5C:
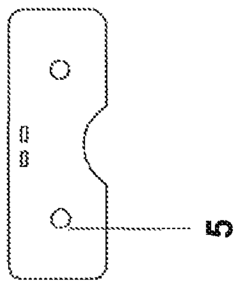
FIG. 5C represents a posterior view of the lighting module of the taillight for vehicles or trailer trucks with built-in RF signal communication antenna.
Figure 5B:
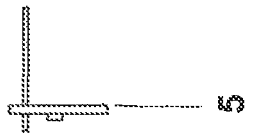
FIG. 5B represents a lateral view of the lighting module of the taillight for vehicles or trailer trucks with built-in RF signal communication antenna.
Figure 5A:
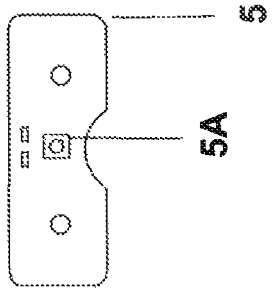
FIG. 5A represents a frontal view of the lighting module of the taillight for vehicles or trailer trucks with built-in RF signal communication antenna.

As can be inferred in the annexed figures which illustrate and integrate the present descriptive report of the invention patent for "Taillight For Vehicles or Trailer Trucks With Built-In RF Signal Communication Antenna", FIG. 1A it is a general presentation, comprised by a complete taillight (1) with its own features, incorporating its own specific electromechanical structure, of high durability and resistance internal and external shapes and disposition adapting to the most varied types of vehicles or trailer trucks and RF communication module, perfectly integrated and symmetrically placed on a base (2) placed vertically and symmetrically in the whole extension of the posterior face of the taillight (1) and parallel to the surface of the vehicle or trailer truck and having a set of connectors (2A) placed vertically, perpendicularly and symmetrically spaced on the posterior face of the base (2) and a set of packers and clutches (2B) placed parallel and symmetrically spaced on the anterior-internal face of the base (2), to close the taillight, fastening in the vehicle or trailer truck body and electronic connection interface; a set of fasteners (3) placed horizontally and symmetrically spaced and trespassing the base (2) and the vehicle or trailer truck surface, as taillight fasteners (1) on the vehicle or trailer truck body; a RF signal communication antenna (4) placed vertically, parallel and symmetrically fixed in the anterior-internal extension of the base (2) and having an integrated circuit board (4A) and a set of openings (4B) placed parallel and symmetrically spaced in the RF signal communication antenna module (4) as transmitter/receptor of the RF; one lighting module (5) placed vertically and symmetrically fit on the internal-anterior face of the base (2) through the central packer (2B) and having an integrated circuit board (5A) with lighting signals, as the light beam generator; and a lens (6) placed vertically and symmetrically in the whole extension of the frontal part of the taillight (1) and fastened by its posterior-lateral extremities on the anterior-lateral extremities of the base (2) as a light beam diffuser.

The taillight for vehicle or trailer trucks with built-in RF signal communication antenna, according to the application needs, may be used with the most varied geometry types such as, for example, circular, rectangular, square, triangular and elongated, among others, primordially according to the design of the vehicle or trailer truck in which it will be used, keeping all features inherent to the taillight (1).

The taillight for vehicle or trailer trucks with built-in RF signal communication antenna may use any type of taillight such as, for example, regular taillights, brake lights, and it also may be installed in any type of vehicle such as, for example, boats, forklifts, trailers, trains and semi-tow trucks; and any type of communication such as, for example, GPS, GPRS and satellite. In both cases keeping all the inherent features of the taillight (1) of involved vehicles.

The taillight for vehicle or trailer trucks with built-in RF signal communication antenna has all its components completely integrated and, therefore, can be rapidly assembled and disassembled, it does not lose parts and none of the parts is subject to breaking or twisting; this ensures a high level of performance and efficiency, with greater durability and absolute safety. After being completely assembled and connected to the vehicle or trailer truck surface, the components become tightly fastened, preventing any individual component to fall apart when in use, and the set becomes totally available to perform the procedures of lighting and RF signal communication transmission of the vehicles or trailer trucks. As such, the taillight (1) can be used without any concern of any nature, especially regarding the durability and safety of its components and the safety of the users.

This explanation shows that it is a vehicular accessory which will be well received by vehicle or trailer truck users, as well as traceability companies in general, for the taillight for vehicle or trailer trucks with built-in RF signal communication antenna presents various advantages, such as: great safety, reliability and agility in the application; great output and performance in its application due to its general conception; high comfort, convenience and safety for users; very high resistance and general durability with little or no wearing of the set as a whole; totally accessible costs providing a great cost/benefit relation; practical and safe use by any user; broad range; very little maintenance; perfect and direct adaptation to the most types of vehicles or trailer trucks, as well as RF signal communication antennas and trackers; high operational precision; high elimination of interferences in the transmissions; great mobility and flexibility of the set; weight and general dimensions totally compatible; complete operational ergonomics; complete invisibility of the RF signal communication antenna; and the guarantee to have a taillight-antenna set in accordance to all existing legislations and norms and the basic conditions required for its application as a whole.

All these attributes allow the classification of the taillight for vehicle or trailer trucks with built-in RF signal communication antenna as a totally versatile, efficient, practical and safe means for the most diverse types of external lighting of a vast range of vehicles or trailer trucks in general, as well as the most diverse types of information transmissions, mainly for a vast range of tracking devices in the most diverse locations, regardless of the general features they may present, being also of easy application and handling with great performance and excellent general features; however, the measures, dimensions and quantities may vary according to the general requirements of each application.

I claim:

1. A taillight assembly for a vehicle or trailer truck, comprising:

one taillight, the taillight comprising:

a symmetrically disposed and built-in base, said base being placed vertically and symmetrically in a whole extension of a posterior face of the taillight and parallel to the surface of the vehicle or trailer truck, the base comprising a posterior face and an anterior-internal face;

a set of connectors placed vertically, perpendicularly and symmetrically spaced on the posterior face of the base;

a set of packers and clutches placed in parallel and symmetrically spaced in the anterior-internal face of the base;

a set of fasteners placed horizontally and symmetrically spaced trespassing the base and the vehicle or trailer truck surface;

an RF signal communication antenna module placed vertically, parallel and symmetrically fit through the whole extension of the anterior-internal face of the base, the RF signal communication antenna module comprising an integrated circuit board and a set of openings placed parallel and symmetrically spaced;

one lighting module placed vertically and symmetrically fit in the anterior-internal face of the base through a central packer, the lighting module comprising a second integrated circuit board with lighting signs; and one lens placed vertically, parallel and symmetrically in an extension of a front part of the taillight, the lens being fastened by its posterior-lateral extremities into anterior-lateral extremities of the base.

* * * * *